(12) United States Patent
Lee et al.

(10) Patent No.: US 7,853,762 B2
(45) Date of Patent: Dec. 14, 2010

(54) CONTROLLING ACCESS TO NON-VOLATILE MEMORY

(75) Inventors: Jung Hwan Lee, Seongnam-si (KR);
Jung Hwan So, Seoul (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 11/559,298

(22) Filed: Nov. 13, 2006

(65) Prior Publication Data
US 2008/0052477 A1    Feb. 28, 2008

(30) Foreign Application Priority Data
Aug. 23, 2006  (KR) ................. 10-2006-0079674

(51) Int. Cl.
*G06F 12/00* (2006.01)
*G06F 13/00* (2006.01)
*G06F 13/28* (2006.01)

(52) U.S. Cl. ........................ 711/159; 711/134
(58) Field of Classification Search .......... 711/134, 711/159
See application file for complete search history.

(56) References Cited

U.S. PATENT DOCUMENTS

| | | | |
|---|---|---|---|
| 6,629,200 B1 * | 9/2003 | Kanamaru et al. | 711/113 |
| 7,275,135 B2 * | 9/2007 | Coulson | 711/143 |
| 2002/0053006 A1 * | 5/2002 | Kawamoto et al. | 711/128 |
| 2003/0110357 A1 * | 6/2003 | Nguyen et al. | 711/136 |
| 2005/0027943 A1 * | 2/2005 | Steere et al. | 711/133 |
| 2005/0283648 A1 * | 12/2005 | Ashmore | 714/5 |
| 2006/0282620 A1 * | 12/2006 | Kashyap et al. | 711/128 |

OTHER PUBLICATIONS

S. Williams, M. Abrams, C.R. Standbridge, G. Abdulla and E.A. Fox. Removal Policies in Network Caches for World-Wide Web Documents. In Proceedings of the ACM Sigcomm96, Aug. 1996, Stanford University.*

* cited by examiner

*Primary Examiner*—Kevin L Ellis
*Assistant Examiner*—Ryan Bertram
(74) *Attorney, Agent, or Firm*—Fish & Richardson P.C.

(57) ABSTRACT

Access to non-volatile memory is controlled when a first data segment is loaded in the non-volatile memory from a hard disk, a weight is calculated for the first data segment stored in the non-volatile memory based on at least one of the access frequency, the access recency, and the size of the first data segment, and the calculated weight is stored in a weight table. A removal rank is calculated for the first data segment based on at least one weight stored in the weight table, a determination is made as to whether a storage capacity of the non-volatile memory is utilized above a predetermined threshold, and a data segment is removed from the non-volatile memory based on a removal rank associated with the data segment.

22 Claims, 10 Drawing Sheets

300

900

1000

US 7,853,762 B2

CONTROLLING ACCESS TO NON-VOLATILE MEMORY

CROSS REFERENCE TO RELATED APPLICATION

This application claims priority to Korean Patent Application No. 10-2006-0079674, filed on Aug. 23, 2006, which is incorporated herein by reference.

BACKGROUND

1. Field

The present disclosure relates to computer memory management, and one particular implementation relates to controlling the storage capacity of a non-volatile memory, such as a flash memory, in a computer system.

2. Description of the Related Art

Non-volatile memory is a type of memory that does not need power in order to maintain stored information. Examples of non-volatile memory include read-only memory, hard disk drives, and flash memory. Flash memory may be NOR flash memory, which has long write and erase times but allows random access to any memory location, and NAND flash memory, which has faster access times but only allows sequential access to data.

SUMMARY

According to one general implementation, storage capacity of a non-volatile memory in a computer system is controlled by loading a first data segment into the non-volatile memory from a hard disk, calculating a weight for the first data segment stored in the non-volatile memory based on at least one of the access frequency, the access recency, and the size of the first data segment, and storing the calculated weight in a weight table. A removal rank is calculated for the first data segment based on at least one weight stored in the weight table, a determination is made as to whether a storage capacity of the non-volatile memory is utilized above a predetermined threshold, and a data segment is removed from the non-volatile memory based on the removal rank.

Implementations may include one or more of the following features. For example, the first data segment may be loaded into the non-volatile memory from the hard disk when the first data segment does not exist in the non-volatile memory. The first data segment may be loaded from the non-volatile memory to a volatile memory.

According to another general implementation, the storage capacity of a first non-volatile memory in a computer system is controlled by calculating a removal rank for a data segment stored in the first non-volatile memory, and, upon determining that a storage capacity of the first non-volatile memory is utilized above a predetermined threshold, removing a data segment from the first non-volatile memory based on the removal rank.

Implementations may include one or more of the following features. For example, calculating the removal rank of the data segment may further include assigning a weight to the data segment and comparing the assigned weight of the data segment to assigned weights of other data segments stored in the first non-volatile memory. The weight may be assigned to the data segment based on a size of the data segment or based on statistics related to the access history of the data segment. Statistics related to the access history of the data segment may include an access frequency of the data segment, or an access recency of the data segment. The data segment may be loaded into the first non-volatile memory from a second non-volatile memory, such as when the data segment does not exist in the first non-volatile memory. The second non-volatile memory may be a hard disk drive, and the first non-volatile memory may be flash memory.

According to another general implementation, an apparatus for controlling storage capacity of a first non-volatile memory in a computer system includes a first non-volatile memory configured to store data segments, and a controller. The controller is configured to load a first data segment in a flash memory from a hard disk, to calculate a weight for the first data segment stored in the first non-volatile memory based on at least one of the access frequency, the access recency, and the size of the first data segment, and to store the calculated weight in a weight table. The controller is further configured to determine a removal rank for the first data segment based on at least one weight stored in the weight table, determine that a storage capacity of the non-volatile memory is utilized above a predetermined threshold, and remove a data segment from the non-volatile memory based on the removal rank.

According to another general implementation, an apparatus for controlling storage capacity of a first non-volatile memory in a computer system includes a controller and the first non-volatile memory, which is configured to store data segments. The controller is configured to calculate a removal rank for a data segment stored in the first non-volatile memory, determine that a storage capacity of the first non-volatile memory is utilized above a predetermined threshold, and remove a data segment from the first non-volatile memory based on the removal rank.

The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Flash memory is used as a cache memory to reduce the time required for a computer system to power up, to access programs, and to write data segments to a hard disk. A cache memory is a memory that a central processing unit (CPU) can access more quickly than the CPU can access other types of memory, such as a hard disk. As the CPU processes data segments, the CPU looks first in the cache memory and, if the CPU finds the data segment there from a previous reading of data segment, the CPU does not have to do the more time-consuming reading of data from other types of memory. If flash memory becomes full while operating as a system cache, some of the stored data must be deleted before storing additional data segments. Indiscriminate deletion of data segments from the flash memory, however, may lead to an increased number of access attempts to the computer's hard disk, which, in turn, leads to an increase in power consumption and access delays.

Figure 1:
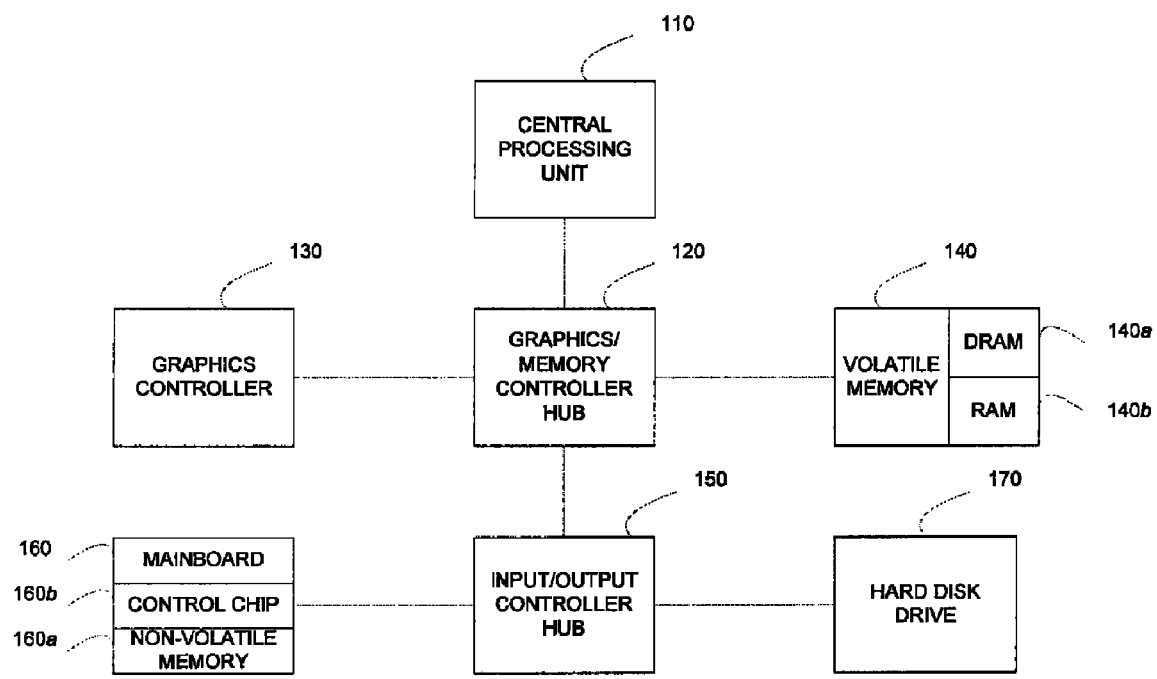
FIGS. 1 and 2 depict exemplary computer systems which use non-volatile memory.

FIG. 1 illustrates an exemplary computer system 100 utilizing non-volatile memory in an INTEL® Hub Architecture (IHA). The IHA is an INTEL® 800-series chipset design that uses a dedicated bus to transfer data between two main processor chips. Non-volatile memory, such as flash memory, may be used as a cache-like memory in the computer system 100 to reduce the time required for the computer system to power up, to access programs, and to write data to the hard disk.

The computer system 100 includes a CPU 110 that interfaces to a graphics/memory controller hub (GMCH) 120. The GMCH 120 provides an interface to a graphics controller 130 and a volatile memory 140. The volatile memory 140 may include a Dynamic Random Access Memory (DRAM) 140a and a Random Access Memory (RAM) 140b. In addition, the GMCH 120 interfaces to an input/output controller hub (ICH) 150 that controls a main board 160 and a hard disk drive (HDD) 170. Generally, access to the volatile memory 140 occurs significantly faster than access to the HDD 170.

The main board hardware 160 includes a non-volatile memory 160a and a control chip 160b for controlling the non-volatile memory 160a. Because the non-volatile memory 160a has a significant storage capacity and is relatively faster than the HDD 170, the non-volatile memory 160a may be used as a cache for the HDD 170. Large amounts of data, such as operating system files, may be stored on the non-volatile memory 160a. In one example, the data segment stored on the HDD 170 is loaded in the non-volatile memory 160a with help from the control chip 160b. The control chip 160b may enable loading of data segments from various memory storage devices, such as the volatile memory 140 or the HDD 170, to the non-volatile memory 160a.

In a similar manner, the control chip 160b may also enable the transfer of data segments from the non-volatile memory 160a to memory storage devices, such as the volatile memory 140 or the HDD 170. The non-volatile memory 160a may be a flash memory, such as NOR or NAND flash memory, read-only memory (ROM), programmable ROM (PROM), erasable programmable ROM (EPROM), electrically erasable programmable ROM (EEPROM), or some other type of non-volatile memory. In an additional implementation, the non-volatile memory 160a is located on a detachable device, such as a universal serial bus (USB) flash drive.

Figure 2:
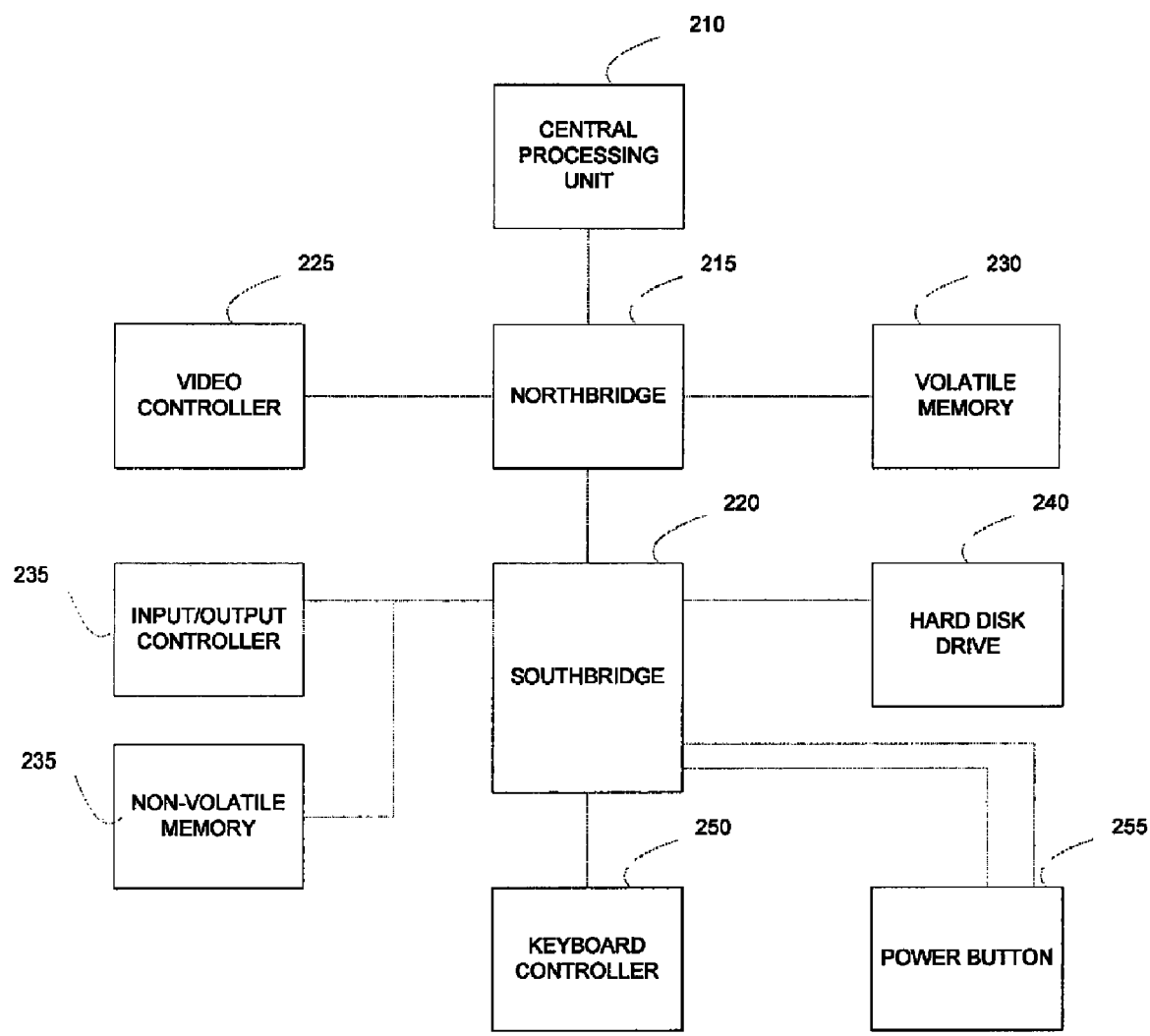

FIG. 2 illustrates an exemplary computer system 200 utilizing non-volatile memory in a northbridge/southbridge architecture. The use of flash memory in the computer system 200 is very similar to the way it is used in the computer system 100. The computer system 200 includes a CPU 210 that interfaces to a northbridge 215 and a southbridge 220. The northbridge 215 provides an interface to a video controller 225 and a volatile memory 230. The volatile memory 230 may include DRAM and/or RAM.

The southbridge 220 provides an interface for an input/output controller 235, a HDD 240, a non-volatile memory 245, as well as peripherals, such as a keyboard controller 250 or a power button 255. As in the computer system 100, the non-volatile memory 245 may be used as an intermediate memory between the HDD 240 and the volatile memory 230. For example, the non-volatile memory 245 may store often-accessed data segments, such as operating system files, as a non-volatile cache to enable the computer system 200 to operate faster. The CPU 210 may enable loading of data segments from other memory storage devices, such as the volatile memory 230 or the HDD 240 to the non-volatile memory 245. Likewise, the CPU 210 may enable loading of data segments from the non-volatile memory 245 to the volatile memory 230 or back to the HDD 240.

Figure 3:
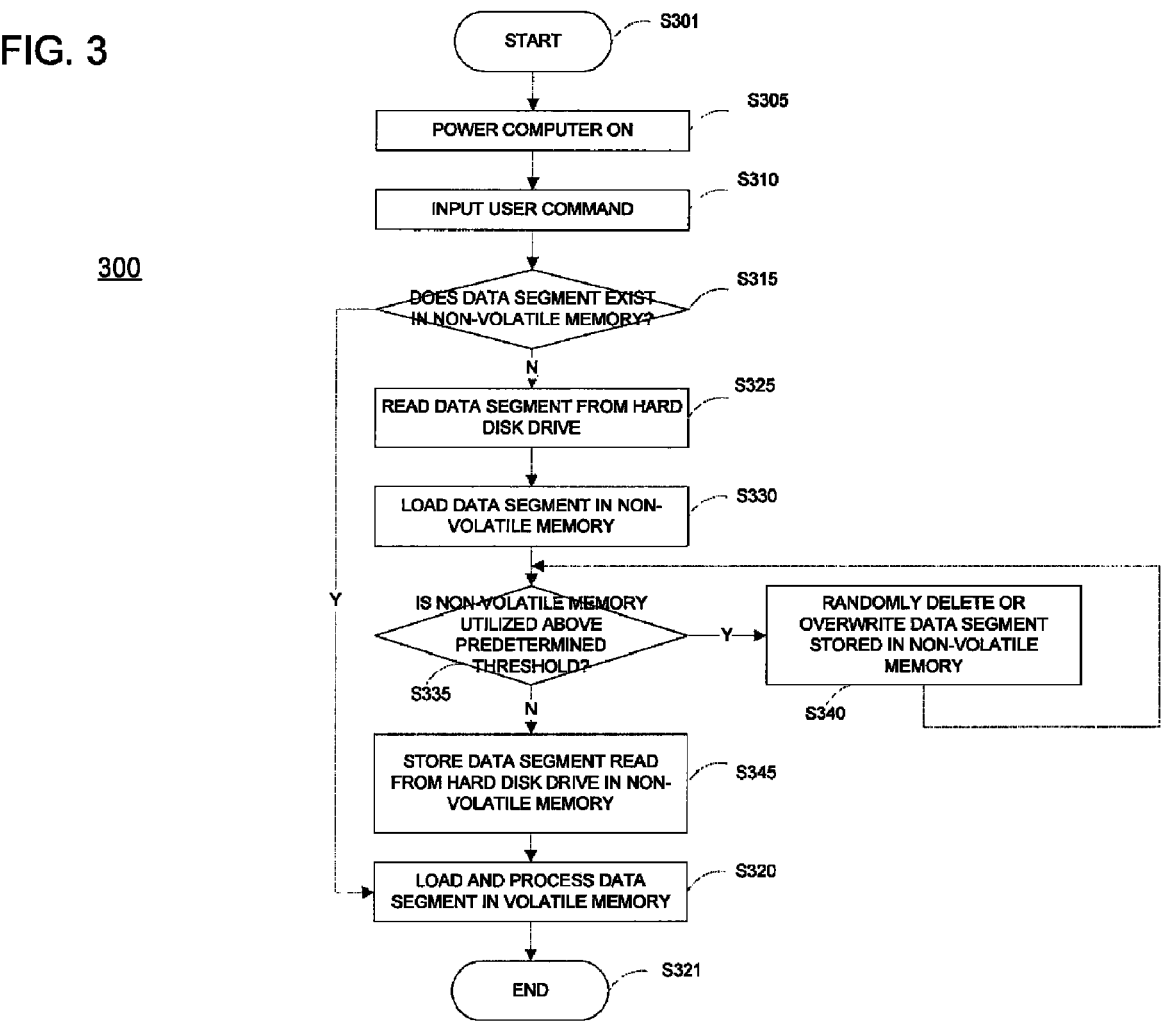
FIG. 3 is a flowchart illustrating an exemplary method for controlling a non-volatile memory in a computer system.

FIG. 3 is a flowchart 300 depicting an exemplary method for controlling a non-volatile memory in a computer system, such as the computer system 200. When the method 300 begins (S301), the computer system 200 is powered on (S305), and a command is input by a user (S310), such as, for example, when a user starts an application program such a web browser or a word processor. In an alternate implementation, user commands are not input into the computer system 200.

The computer system 200 determines whether data segments, such as programs, system drivers, or other data, are stored in the non-volatile memory 245 (S315). If a data segment is stored in the non-volatile memory 245 (S315), the data segment is loaded from the non-volatile memory 245 to the volatile memory 230 (S320), and the method 300 ends (S321). If a data segment is not stored in the non-volatile memory 245 (S315), the data segment is read from the HDD 240 (S325) and loaded in the non-volatile memory 245 (S330). The non-volatile memory 245, however, may not have sufficient space to store the data segment read from the HDD 240.

If it is determined that the non-volatile memory 245 is full or utilized above a predetermined threshold (S335), data segments stored in the non-volatile memory 245 are randomly deleted or overwritten (S340) until the flash memory is no longer utilized above the predetermined threshold (S335). The predetermined threshold may be expressed in terms of percentages or actual storage capacity, such as 90% or 100 megabytes.

If it is determined that the non-volatile memory 245 has sufficient space to store the data segment from the HDD 240 (i.e., the non-volatile is not utilized above a predetermined threshold), the data segment from the HDD 240 is stored in the non-volatile memory 245 (S345). The non-volatile memory 245 may be used as a non-volatile cache to enable computer system 200 to operate faster, by loading the data segment to the volatile memory 230, such as DRAM or RAM (S320), thereby ending the method 300 (S321).

One problem with randomly removing data segment from the flash memory is that the same data segment may be required during the next memory access. Consequently, the recently removed data segment will have to be once again loaded in the flash memory from the HDD. However, each access to the HDD increases power consumption of the computer system and increases access delays because the delay for reading a data segment from the HDD is significantly greater than the delay for reading the data segment from the flash memory. As a result, it is desirable to reduce both power consumption and access delays in the computer system by providing an intelligent method of removing unused data segments from the flash memory. Thus, the flash memory should maintain those data segments that are statistically more likely to be accessed in the future. In addition, other factors, such as the size of the stored data segments, should be taken into the consideration to achieve better utilization of the flash memory.

Figure 4:
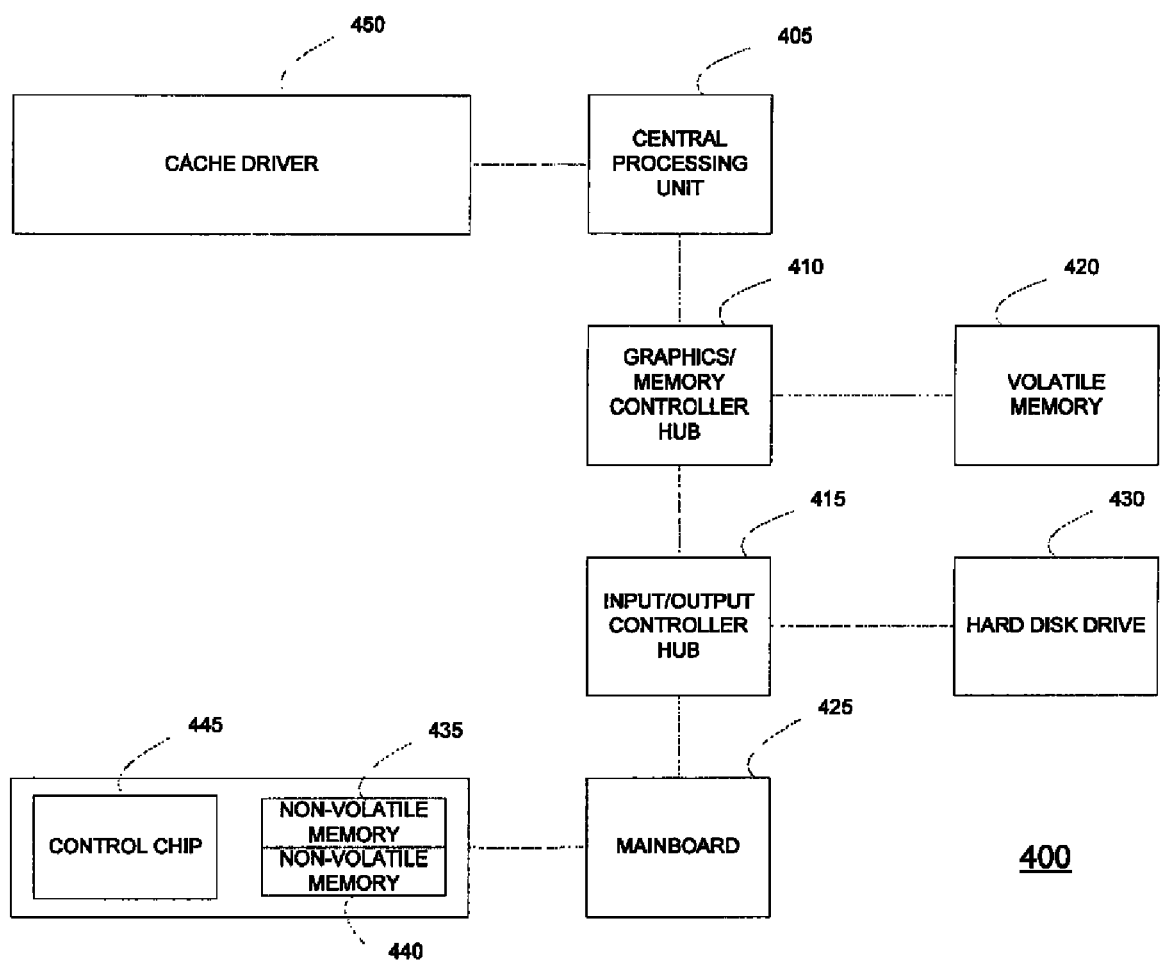
FIGS. 4 and 5 are block diagrams depicting other exemplary computer systems utilizing non-volatile memory.

FIG. 4 is a block diagram illustrating another exemplary computer system 400 utilizing dual non-volatile memories, such as in an IHA architecture. The computer system 400 includes a CPU 405, a GMCH 410, and a ICH 415. The GMCH 410 controls a graphic processor and a volatile memory 420, such as DRAM. The ICH 415 controls a main board 425 and a HDD 430. The main board 425 also includes dual non-volatile memories 435 and 440, as well as a control chip 445.

As in the computer systems 100 and 200, non-volatile memories may be used as intermediate memory between the HDD 430 and the volatile memory 420. Data segments may be loaded to the non-volatile memories 435 and 440 from the HDD 430 or the volatile memory 420. Similarly, data segments may be loaded from the non-volatile memories 435 and 440 to the volatile memory 420 or the HDD 430. In addition, the non-volatile memories 435 and 440 may be of different types, such as NAND-based or NOR-based flash memories.

A cache driver 450 may be stored in a register of the CPU 405 to enable the non-volatile memories 435 and 440 to operate as non-volatile cache memory for the computer system 400. Since cache memory is a memory that the CPU 405 can access more quickly than it can access other types of memory, such as the HDD 430 or the volatile memory 420, the CPU 405 searches for data segments in the cache memory before seeking the data segments from other types of memory.

Figure 5:
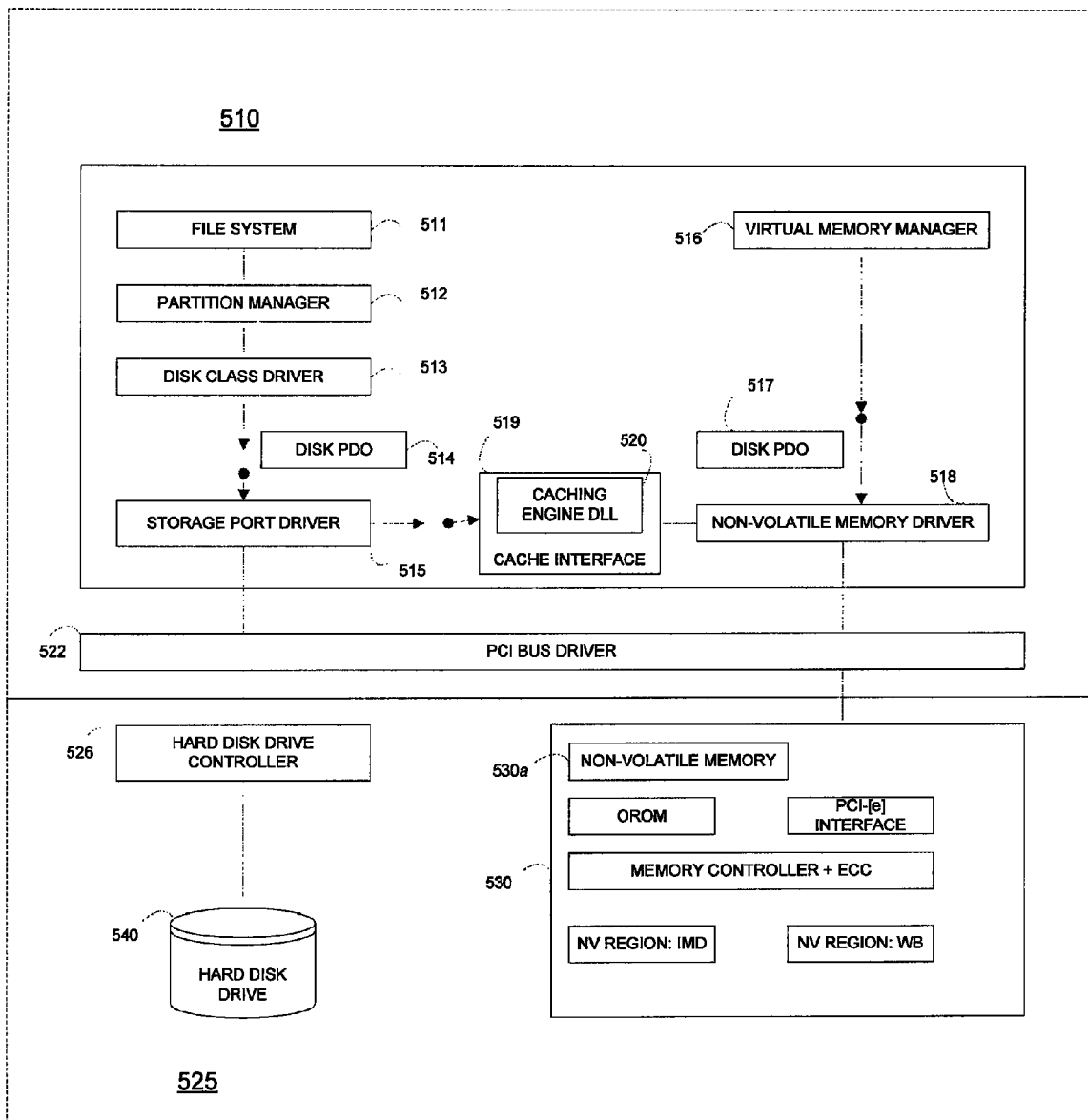

FIG. 5 is a block diagram depicting another exemplary computer system 500, which uses non-volatile memory via a Peripheral Component Interconnect (PCI) bus architecture. The computer system 500 includes a software component 510 and a hardware component 525, where the software component 510 includes a file system 511 interfacing with a partition manager 512, which in turn interfaces with a disk class driver 513. The disk class driver interfaces with a disk physical device object (PDO) 514 that represents an individual device on a storage port driver 515, which is, for example a MICROSOFT® or INTEL® matrix storage manager (iMSM). In addition, the software component 510 includes a virtual memory manager, such as an EMD IMD manager, that interfaces through a disk PDO 517 with a non-volatile memory driver 518, such as, for example, the MICROSOFT® WINDOWS® Driver Model (WDM) function driver. The storage port driver 515 communicates with a non-volatile memory driver though a cache interface 519 that includes a caching engine dynamic link library (DLL) 520. The software component 510 also includes a PCI bus driver 522 that implements a PCI bus.

The hardware component 525 includes a main board 530 with non-volatile memory 530a, and a HDD 540. The HDD 540 stores the file system and corresponding system software. The main board 530 stores the virtual memory manager and non-volatile memory management software. The main board 530 interfaces with the HDD 540 through the PCI bus and a HDD controller 526 that is connected between the PCI bus and the HDD 540. A data segment is moved to the non-volatile memory 530a from the HDD 540 through the HDD controller 526 and the PCI bus. In addition, caching of the data segment stored on the HDD 540 is enabled by the cache interface 519 of the software component 510.

Figure 6:
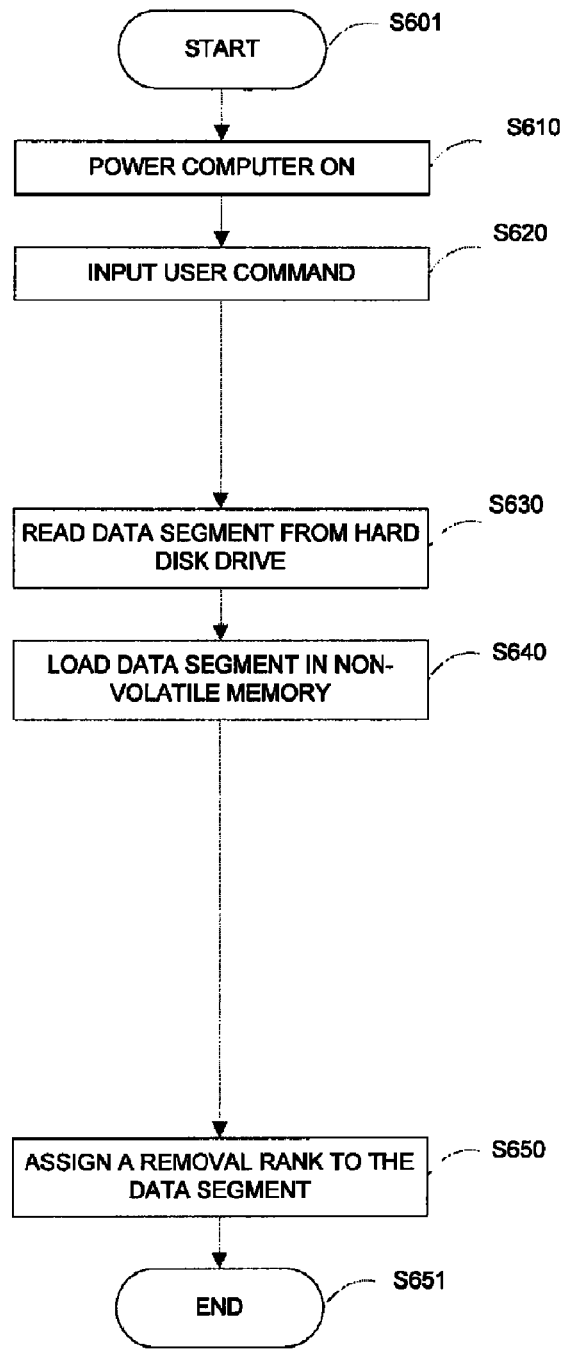
FIG. 6 is a flowchart depicting a calculation of a removal rank for a data segment stored on a non-volatile memory.

FIG. 6 is a flowchart depicting a method 600 for calculating a removal rank for data segments stored on a non-volatile memory. When the method 600 begins (S601), the computer system is powered on (S610). A user may enter a command to the computer system (S620), such as to start an application like a web browser. Either based on the user's command or automatically, a data segment is read from a HDD (S630) and loaded in the non-volatile memory (S640). The same data segment from the HDD may also be loaded in the volatile memory, such as DRAM.

Once the data segment has been loaded in the non-volatile memory, the loaded data segment is assigned a removal rank (S650). The removal rank indicates the order in which the data segment will be removed from the non-volatile memory, should the non-volatile memory become over-utilized or full. For example, a removal rank of 1 for a specific data segment may indicate that that data segment will be first to get deleted when space is needed for a new data segment. The calculated removal rank may be stored in a form of table on the non-volatile memory, the HDD, or the volatile memory. Additionally or alternatively, the calculated removal rank may be stored in other forms of data structures, such as trees. The removal rank for a segment may be updated over time.

The removal rank for the loaded data segment is calculated based on various factors. These factors may be statistics related to the access history of the data segment, including data access frequency, data access recency, or other statistical information related to history of access attempts to the data segment. In addition, the size of the data segment may also be taken into consideration. Thus, storing preference, and low associated removal ranks, are given to data segments that are accessed frequently/recently and that are not too large.

On the other hand, large and under-utilized data segments are marked for removal from the non-volatile memory. For example, a weight of a data segment may be increased if the data segment has been accessed at least once within the last month. In another example, the weight of the data segment may be increased every time the data segment is accessed. Finally, the weight of a data segment may be decreased for each N Mbytes of the data segment's size. The increases/decreases in the data segment's weight may vary depending on the configuration of the system. Thus, if the non-volatile memory has a large storage capacity, the non-volatile memory may be able to store more data and, hence, the weight decrease for each N Mbytes may be selected to be smaller than the weight increase for recent or frequent accesses.

Furthermore, in a system with small non-volatile storage capacity, even a recently accessed data segment may be removed quicker if the data segment is very large when compared to other data segments. Storing smaller chunks of data in the non-volatile memory may prevent frequent access attempts to the HDD. Such access attempts usually consume considerable amounts of power regardless of the accessed data size.

The removal rank for data segments stored in the non-volatile memory may be calculated every time a new data segment is added to the non-volatile memory. In addition, the removal rank may be calculated at periodic time intervals or based on user's commands.

Figure 7:
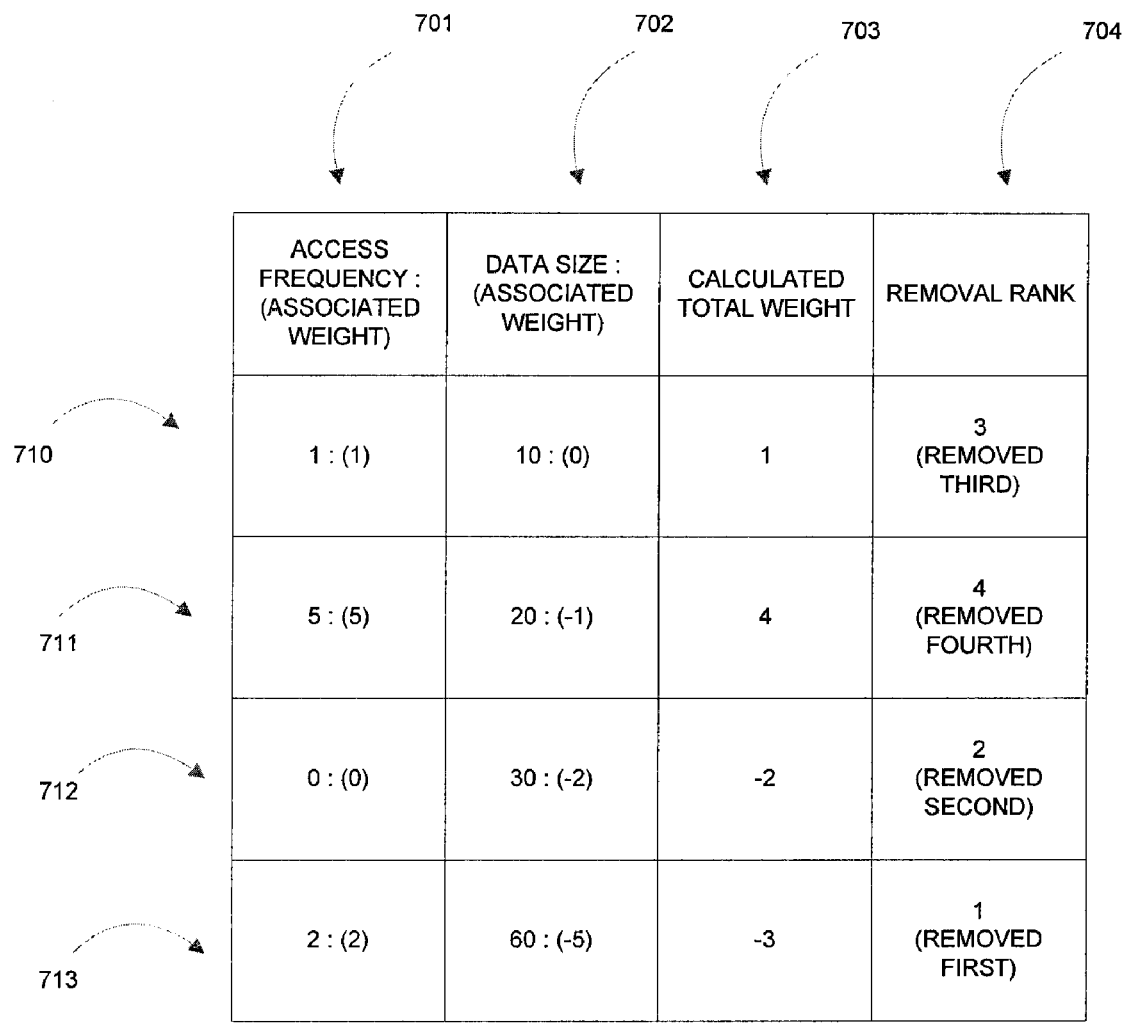
FIG. 7 depicting an exemplary data structure storing removal ranks for data segments loaded on a non-volatile memory.

FIG. 7 depicts an exemplary data structure 700 storing removal ranks for data segments loaded on a non-volatile memory. The rows 710 to 713 of the data structure 700 each correspond to the different data segments stored in the non-volatile memory. For example, the row 710 includes individual weight values assigned to the data segment based on access frequency and data size. In addition, the row 710 includes the total calculated weight for the data segment and the corresponding removal rank for that data segment, which are based on the total calculated weight of the segment relative to other data segments. Rows 711 to 713 include similar weights and rankings for other data segments.

As reflected by column 701, the weight of each data segment is increased by 1 point for each access attempt. For example, the data segments associated with rows 710 to 713 are accessed 0, 1, 2, and 5 times, respectively, and their corresponding individual weight values for access frequency are calculated as 0, 1, 2, and 5, respectively.

In addition, and as reflected in column 702, data segments are assigned negative weight values for each 10 megabyte increase, when compared to smallest data segment. Therefore, if sizes of data segments represented by rows 710 to 713 are 10, 20, 30, and 60 megabytes, the individual weight values of data segments are computes as 0, −1, −2 and −5, respectively. Accordingly, and as reflected in column 703, the total calculated weights of the data segments are calculated as sums of individual weight values for all categories, and are 1, 4, −2, and −3 for rows 710 to 713, respectively.

Consequently, the data segment represented by the row 703 has the highest removal rank, since it has the lowest total calculated weight (−3) because of its large size. On the other hand, the data segment represented by the row 711 has the lowest removal rank because it is the most frequently accessed data segment in the non-volatile memory and is also comparatively small in size.

Figure 8:
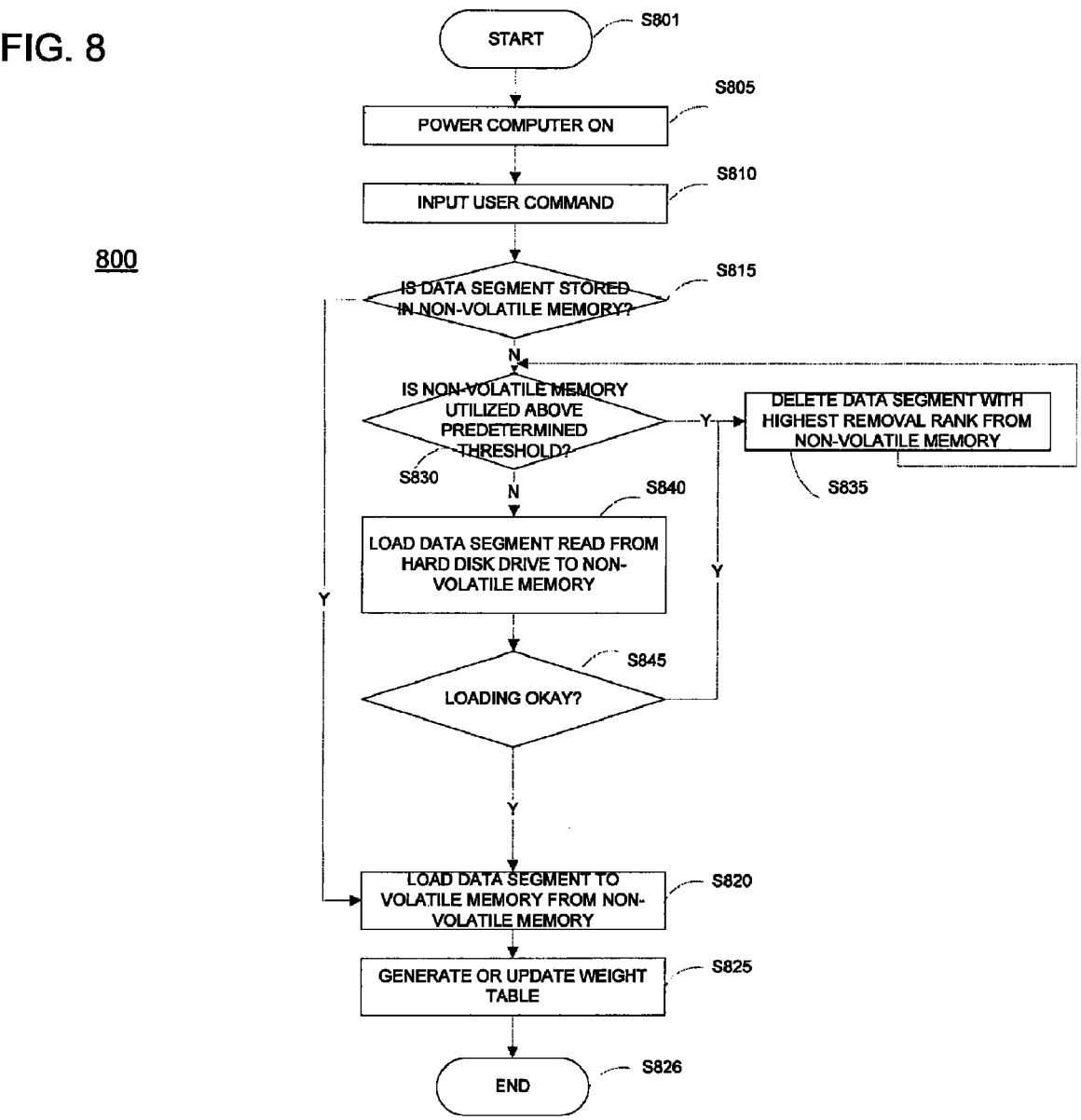
FIGS. 8-10 are flowcharts depicting exemplary methods for controlling non-volatile memory in a computer system.

FIG. 8 is a flowchart illustrating an exemplary method 800 for controlling non-volatile memory in a computer system. When the method 800 begins (S801), the computer system is powered on (S805), and commands are input by a user (S810), such as when a user starts an application program like a web browser or a word processor. In an alternative implementation, users do not input commands into the computer system, which instead proceeds automatically.

The computer system determines whether a data segment used for operating the system, such as application programs, system drivers, or other data, is stored in a non-volatile memory (S815). If the data segment is stored in the non-volatile memory (S815), the data is loaded from the non-volatile memory to the volatile memory, such as DRAM or RAM (S820), such as by using the cache driver. In addition, a data structure that stores removal ranks for data segments stored on the non-volatile memory is updated or generated, using the procedures discussed with respect to FIGS. 6 and 7 (S825). The data structure may be a weight table or a tree.

If the data is not stored in the non-volatile memory (S815), the computer system determines whether the non-volatile memory is full or utilized above a predetermined threshold (S830). If the non-volatile memory is full or utilized above a predetermined threshold (S830), a data segment in the non-volatile memory with the highest removal rank is deleted (S835). If it is determined that the non-volatile memory has sufficient space to store the data from the HDD (S830), the data from the HDD is stored in the non-volatile memory (S840). A check is performed to ensure that data was loaded properly (S845) and, if the process of loading data from the HDD to the non-volatile memory encounters a problem, the computer system deletes a data segment with the highest removal rank (S835).

If loading of data from the HDD to the non-volatile memory proceeds correctly (S845), the data is also loaded from the non-volatile memory to the volatile memory (S820). The data may be loaded using the cache driver. In addition, a data structure storing removal ranks for data segments stored on the non-volatile memory is updated or generated, according to the procedures discussed with respect to FIGS. 6 and 7 (S825), and the method 800 ends (S826).

Figure 9:
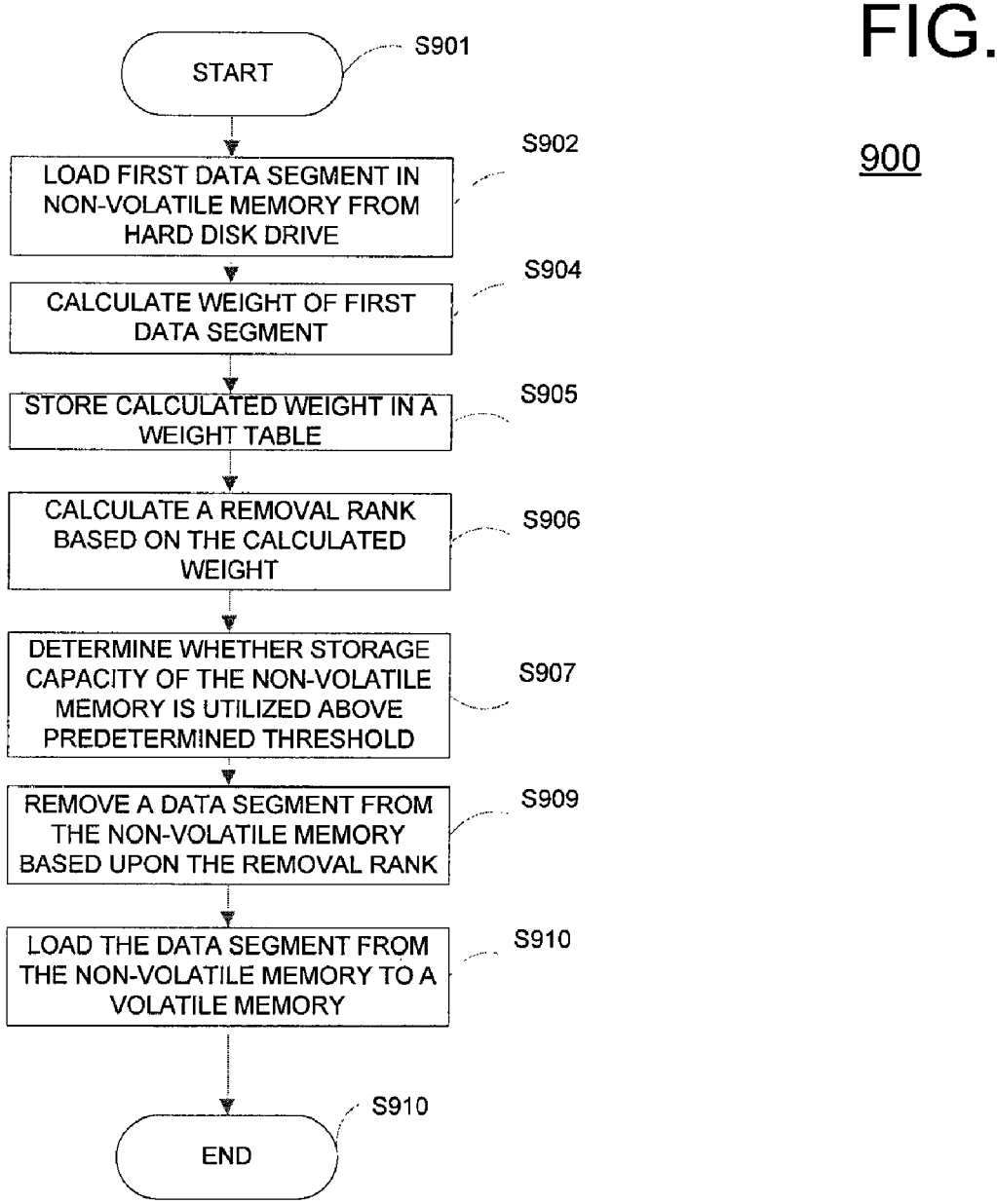
Figure 10:
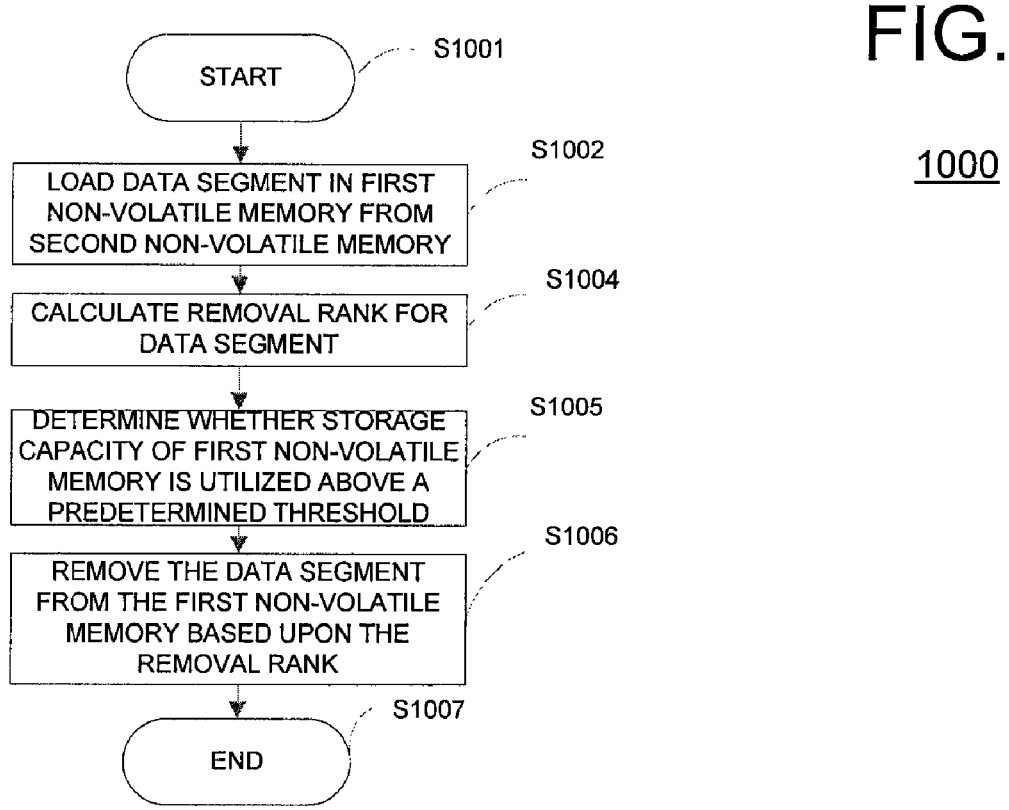

FIGS. 9 and 10 are flowcharts depicting exemplary methods 900 and 1000 for controlling non-volatile memory in a computer system. When the method 900 begins (S901), a first data segment is loaded in a non-volatile memory from a hard disk (S902), and a weight is calculated for the first data segment stored in the non-volatile memory based on at least one of the access frequency, the access recency, and the size of the first data segment. (S904). The first data segment may be loaded into the non-volatile memory from the hard disk when the data segment does not exist in the non-volatile memory.

The calculated weight is stored in a weight table (S905), and a removal rank is calculated for the first data segment based on at least one weight stored in the weight table (S906). It is determined whether a storage capacity of the non-volatile memory is utilized above a predetermined threshold (S907) and, if the storage capacity of the non-volatile memory is utilized above the predetermined threshold (S907), a data segment is removed from the non-volatile memory based on the removal rank (S909). The data segment may be loaded from the non-volatile memory to a volatile memory (S910), thereby ending the method 900 (S911).

Referring to FIG. 10, when the method 1000 begins (S1001), a data segment may be loaded into the first non-volatile memory from a second non-volatile memory, such as when the data segment does not exist in the first non-volatile memory (S1002). The second non-volatile memory may be a hard disk drive, and the first non-volatile memory may be flash memory.

A removal rank is calculated for a data segment stored in a first non-volatile memory (S1004). Calculating the removal rank of the data segment may further include assigning a weight to the data segment and comparing the assigned weight of the data segment to assigned weights of other data segments stored in the first non-volatile memory. Assigning the weight to the data segment may include assigning the weight to the data segment based on a size of the data segment, or assigning the weight to the data segment based on statistics related to the access history of the data segment. Statistics related to the access history of the data segment may include an access frequency of the data segment, or an access recency of the data segment.

It is determined whether a storage capacity of the first non-volatile memory is utilized above a predetermined threshold (S1005). A data segment is removed from the first non-volatile memory based on the removal rank (S1006), thereby ending the method 1000 (S1007).

It is understood that various modifications may be made without departing from the spirit and scope of the claims. Thus, advantageous results still could be achieved if steps of the disclosed techniques were performed in a different order and/or if components in the disclosed systems were combined in a different manner and/or replaced or supplemented by other components. For example, data may be loaded from not only the HDD, but other storage devices as well. The non-volatile memory may also be either internal to the computer system or located on an external/detachable device, such as a USB flash drive. In addition, other types of memory may be used instead of non-volatile memory, including both volatile and non-volatile memory.

The arrangements have been described with particular illustrative embodiments. It is to be understood that the concepts and implementations are not however limited to the above-described embodiments and that various changes and modifications may be made.

What is claimed is:

1. A method of controlling storage capacity of a memory in a computer system, the method comprising:

loading a first data segment in a random area of a memory from a hard disk;

determining a first weighted factor for the first data segment based on an access frequency of the first data segment, the first weighted factor being increased by a first amount for each time the first data segment is accessed;

determining a second weighted factor for the first data segment based on the size of the first data segment, the second weighted factor being decreased by a second amount for every particular storage amount in the size of the first data segment;

calculating a weight for the first data segment stored at the random area in the memory based on a calculated sum of the first weighted factor that relates to access frequency of the first data segment and the second weighted factor that relates to the size of the first data segment;

storing the calculated weight in a table along with weights calculated for every data segment stored at the random area in the memory;

calculating, based on a list of the weights stored in the table, a removal rank for each data segment stored at the random area in the memory from the hard disk including the first data segment stored at the random area of the memory;

storing the calculated removal ranks for each of the data segments in the table;

determining that a whole storage capacity of the memory is utilized above a predetermined threshold; and in response to determining that the whole storage capacity of the memory is utilized above the predetermined threshold:

accessing the stored removal ranks from the table;

evaluating the accessed removal ranks to identify a removal rank that indicates a lowest benefit of being maintained in the random area in the memory based on a combination of access frequency and size of a data segment corresponding to the removal rank; and removing, from the random area in the memory, the data segment corresponding to the removal rank that indicates a lowest benefit of being maintained in the random area in the memory, wherein the second amount by which the second weighted factor is decreased for every particular storage amount in the size of the first data segment is different than the first amount by which the first weighted factor is increased for each time the first data segment is accessed.

2. The method of claim 1, wherein the first data segment is loaded into a non-volatile memory from the hard disk when the first data segment does not exist in the non-volatile memory.

3. The method of claim 1 further comprising loading the first data segment from a non-volatile memory to a volatile memory.

4. The method of claim 1 wherein calculating the weight for the first data segment stored in a non-volatile memory is based on all three of the access frequency, an access recency, and the size of the first data segment.

5. The method of claim 1, wherein the weighted factor of the access frequency of a data segment is increased for each access attempt the data segment and the weighted factor of the size of the data segment is decreased for each increase of a predetermined data size of the data segment.

6. The method of claim 5, wherein the data segment having a highest removal rank has the lowest total calculated weight.

7. The method of claim 5, wherein the data segment having a lowest removal rank is calculated based on a most frequently accessed data segment in the non-volatile memory and is also small in size compared to other data segments.

8. The method of claim 1, wherein the second amount by which the second weighted factor is decreased for every particular storage amount in the size of the first data segment is smaller than the first amount by which the first weighted factor is increased for each time the first data segment is accessed.

9. The method of claim 1, wherein calculating a removal rank for each data segment stored at the random area in the memory from the hard disk including the first data segment stored at the random area of the memory comprises calculating a removal rank for each data segment stored at the random area in the memory from the hard disk including the first data segment stored at the random area of the memory each time a new data segment is added to the random area in the memory.

10. A method of controlling storage capacity of a first memory in a computer system, the method comprising:

calculating removal ranks for data segments stored at a random area of the first memory by assigning weights to the data segments;

storing the removal ranks in a table;

determining that a storage capacity of the first memory is utilized above a predetermined threshold; and removing a data segment stored at the random area in the first memory based on a removal rank previously calculated for that data segment and stored in the table, wherein a weight of each data segment is increased for each access attempt and each of the data segments is assigned negative weight values for each of a predetermined data size increase, wherein an amount of the assigned negative weight value for each of the predetermined data size increases is different than an amount of the weight increase for each access attempt, wherein a total calculated weights of the data segments are calculated as sums of the access frequency and the data size, wherein the data segment having a highest removal rank has the lowest total calculated weight, and wherein the data segment having a lowest removal rank is calculated based on a most frequently accessed data segment in the memory and is also small in size compared to other data segments.

11. The method of claim 10, wherein calculating the removal ranks of the data segments includes comparing the assigned weight of the data segment to assigned weights of other data segments stored in the first memory.

12. The method of claim 10, wherein assigning weights to the data segments includes assigning a weight based on an access recency of the data segments.

13. The method of claim 10, wherein the data segment is loaded into a first non-volatile memory from a second non-volatile memory.

14. The method of claim 13, wherein the data segment is loaded into the first non-volatile memory from the second non-volatile memory when the data segment does not exist in the first non-volatile memory.

15. The method of claim 14, wherein the second non-volatile memory is a hard disk drive.

16. The method of claim 10, wherein a first non-volatile memory is flash memory.

17. The method of claim 10, wherein removal ranks for data segments are calculated at periodic time intervals.

18. The method of claim 10, wherein removal ranks for data segments are calculated in response to a user input.

19. An apparatus for controlling storage capacity of a first memory in a computer system, the apparatus comprising:

a first memory configured to store data segments at a random area in the first memory;

a controller configured to:

load a first data segment at the random area of a flash memory from a hard disk;

calculate a weight for the first data segment stored in the first memory based on each of an access frequency, an access recency, and the size of the first data segment;

store the calculated weight in a table;

calculate a removal rank for the first data segment stored at the random area based on at least one weight stored in the table;

store the removal rank for the first data segment in the table;

determine that a storage capacity of the memory is utilized above a predetermined threshold; and remove a data segment from the memory based on a removal rank associated with the data segment, wherein a weight of each data segment is increased for each access attempt and each of the data segments is assigned negative weight values for each a predetermined data size increase, wherein an amount of the assigned negative weight value for each of the predetermined data size increases is different than an amount of the weight increase for each access attempt, wherein a total calculated weights of the data segments are calculated as sums of the access frequency and the data size, wherein the data segment having a highest removal rank has the lowest total calculated weight, and wherein the data segment having a lowest removal rank is calculated based on a most frequently accessed data segment in the memory and is also small in size compared to other data segments.

20. The apparatus of claim 19, wherein removal ranks for data segments are calculated at periodic time intervals.

21. The apparatus of claim 19, wherein removal ranks for data segments are calculated in response to a user input.

22. An apparatus for controlling storage capacity of a first non-volatile memory in a computer system, the apparatus comprising:

a first non-volatile memory configured to store data segments at a random area of the memory;

a controller configured to:

calculate removal ranks for data segments stored in the first non-volatile memory based on a sum of a weighted factor of an access frequency of each data segment, a weighted factor of an access recency of each data segment, and a weighted factor of the size of each data segment;

store, in a table, the removal ranks for each of the data segments;

determine that a whole storage capacity of the first non-volatile memory is utilized above a predetermined threshold; and remove a data segment stored at the random area in the first non-volatile memory based on a removal rank previously calculated for the data segment and stored in the table, wherein the weighted factor of the access frequency of each data segment is increased for each time each data segment is accessed and the weighted factor of the size of each data segment is decreased for every particular storage amount in the size of each data segment, and wherein an amount by which the weighted factor of the size of each data segment is decreased for every particular storage amount in the size of each segment is different than the amount by which the weighted factor of the access frequency of each data segment is increased for each time each data segment is accessed.

* * * * *